United States Patent [19]
Mudzhiri et al.

[11] Patent Number: 4,877,772
[45] Date of Patent: * Oct. 31, 1989

[54] ALCOHOLIC BEVERAGE AND PROCESS FOR PRODUCING SAME

[76] Inventors: Levan A. Mudzhiri, Pavlova, 55, kv. I6.; Gia G. Alkhazashvili, Vazha Pshavela, 55, 2 kvartal, korpus 3, kv.22.; Elena I. Kalatozishvili, Akhmeteli, 7, kv. I7.; Gia O. Chekurishvili, Paliashvili, 36., all of Tbilisi; Izrail I. Brekhman, Admirala Fokina, 27, kv. 4.; Alexandr E. Bulanov, Khabarovskaya, I2, kv. 3., both of Vladivostok; Mira I. Polozhentseva, 2 Parkovaya, I3, kv. 22., Vladivostok, all of U.S.S.R.

[*] Notice: The portion of the term of this patent subsequent to Feb. 28, 2006 has been disclaimed.

[21] Appl. No.: 937,630

[22] Filed: Dec. 3, 1986

[51] Int. Cl.$^4$ .......................... C12G 1/00; C12C 11/00
[52] U.S. Cl. ...................................... 514/23; 514/811; 426/11; 426/15
[58] Field of Search ..................... 514/811, 23; 426/11, 426/15

[56] References Cited

U.S. PATENT DOCUMENTS

| | | | |
|---|---|---|---|
| 4,027,017 | 5/1977 | Hata et al. | 514/811 |
| 4,058,601 | 11/1977 | Hata et al. | 514/811 |
| 4,115,576 | 9/1978 | Penn | 514/811 |
| 4,318,927 | 3/1982 | Marshall | 426/11 |
| 4,593,020 | 6/1986 | Guinot | 514/811 |
| 4,596,825 | 6/1986 | Suda et al. | 514/811 |
| 4,703,045 | 10/1987 | Guinot | 514/811 |

FOREIGN PATENT DOCUMENTS

EP19423 11/1980 European Pat. Off. .
2340725 9/1977 France .

*Primary Examiner*—Ronald W. Griffin
*Attorney, Agent, or Firm*—Burgess, Ryan & Wayne

[57] ABSTRACT

The present invention relates to the manufacture of liqueur and vodka.

An alcoholic beverage comprises a composition involving 219–270 mg/g of leukoanthocyans, 153–187 mg/g of catechins, 81–99 mg/g of flavanols, 68–83 mg/g of lignin, 216–264 mg/g of reducing sugars, 18–22 mg/g of pectin, 27–33 mg/g of free aminoacids, 36–44 mg/g of organic acids, 4.5–5.5 mg/g of sterols, 1.35–1.65 mg/g of methylsterols, 1.98–2.42 mg/g of dimethylsterols, 13.5–16.5 mg/g of lignanes, 9–11 mg/g of lignane glycosides, 13.5–16.5 mg/g of phenoloacids, 4.5–5.5 mg/g of phenol aldehydes, 4.5–5.5 mg/g of alkylferulates, a fruit alcohol, sugar, citric acid, a tint and an aqueo-alcoholic liquid.

The alcoholic beverage is produced by blending ingredients thereof, a triple successive heat treatment, cooling, settling and filtration.

6 Claims, No Drawings

ALCOHOLIC BEVERAGE AND PROCESS FOR PRODUCING SAME

FIELD OF THE INVENTION

The present invention relates to the manufacture of strong alcoholic beverages and, more specifically, to an alcoholic beverage and to a process for producing same.

BACKGROUND OF THE INVENTION

Known in the art is an alcoholic bitter liqueur

| | |
|---|---|
| Aralia root | 2.5 |
| Eleutherococcus extract | 20 |
| Schizandra (fresh berry) | 345 |
| sugar | 200 |
| natural honey | 50 |
| tint | 25 |
| aqueous-alcoholic liquid | the balance. | comprising the following ingredients, kg/1,000 dal:
(See "formulations of Liqueur-Vodka Products and Vodkas", "Legkaya i Pistschevaya Promyshlennost" (Light and Food Industry) Publishing House, Moscow, 1981, p. 188).

Also known in the art as an alcoholic bitter liqueur including the following ingredients, kg/1,000 dal:

| | |
|---|---|
| Eleutherococcus extract | 200 |
| Schizandra (fresh berry) | 92 |
| Schizandra (seeds) | 0.6 |
| natural honey | 50 |
| tint | 30 |
| aqueous-alcoholic liquid | the balance. |

(See "Formulations of Liqueur-Vodka Products and Vodkas", Light and Food Industry Publishing House, Moscow, 1981, p.206).

The prior art alcoholic liqueurs are produced by way of blending the starting components, a successive introduction, into the resulting blend, of an aqueous-alcoholic liquid, settling of the resulting mixture and filtration thereof.

As it is seen from the above-specified formulations, the latter contain a biologically active extract of Eleutherococcus which lowers the toxic effect of ethanol in a living organism.

However, low taste properties of the prior art beverages caused by a limited content of aromatic compounds, as well as a "pharmaceutical" aftertaste due to the presence of Eleutherococcus extract, high costs of the starting ingredient—Eleutherococcus extract and limited availability of this plant do not enable a wide scale consumption of these prior art beverages.

It is an object of the present invention to provide such an alcoholic beverage having improved resistance of the organism to alcohol and to reduce its toxic effects by slowing down the processes of a pathological addiction to alcohol.

It is another object of the present invention to provide such an alcoholic beverage which would feature high organoleptic properties.

It is still another object of the present invention to provide a process for the production of an alcoholic beverage capable of improving the organism's resistance, lowering the toxic effects of alcohol by delaying pathological processes of addiction towards alcohol at high organoleptic properties of the beverage.

These objects are accomplished by providing an alcoholic beverage comprising sugar, citric acid, a tint and an aqueous-alcoholic liquid, according to the present invention and which also incorporates fruit alcohol and a composition of substances inhibiting the development of a pathological addiction to alcohol containing, mg/g: leukoantocyanes—219–270, catechins—153–187, flavanols—81–99, lignin—68–83, reducing sugars—216–264, pectin—18–22, free aminoacids—27–33, organic acids—36–44, sterols—4.5–5.5, methylsterols—1.35–1.65, dimethylsterols—1.98–2.42, lignanes—13.5–16.5, lignane glycosides—9–11, phenoloacids—13.5–16.5, phenol aldehydes—4.5–5.5, alkylferulates—4.5–5.5, the ingredients being present in the following proportions, kg per 1,000 dal of the beverage:

| | |
|---|---|
| the above-specified composition | 473–493 |
| fruit alcohol 40° | 4,950–5,050 |
| sugar | 95–105 |
| citric acid | 1.8–2.2 |
| tint | 28–32 |
| aqueous-alcoholic liquid | the balance. |

The alcoholic beverage according to the present invention is capable of inhibiting a pathological addiction to alcohol; furthermore, it has high organoleptic properties—the tasting test of the beverage is not less than 9.1 points.

This alcoholic beverage is produced by a process comprising blending of sugar, citric acid and a tint, followed by the addition, to the resulting blend, of an aqueous-alcoholic liquid, settling and filtration, wherein according to the present invention blended are 473–493 kg of a composition inhibiting a pathological addition to alcohol, 4,950–5,050 kg of a 40° fruit alcohol, 95–105 kg of sugar, 1.8–2.2 kg of citric acid and 28–32 kg of tint; to the resulting blend the aqueous-alcoholic liquid is added in the amount required for the preparation of 1,000 dal of the beverage; prior to settling and filtration the final blend is subjected to a triple successive thermal treatment for 5–8 hours at a temperature of 70°–80° C. and to cooling to attain a temperature within the range of from 0° to −10° C.

Other objects and advantages of the present invention will now be more fully apparent from the following detailed description of the alcoholic beverage and the process for producing same according to the present invention.

DETAILED DESCRIPTION OF THE INVENTION

As it has been mentioned hereinbefore, the alcoholic beverage according to the present invention incorporates a composition inhibiting a pathological addiction to alcohol. This composition contains leukoanthocyans in an amount of 219–270 mg/g, catechins in an amount of 153–187 mg/g, flavanols in an amount of 81–99 mg/g, lignin in an amount of 68–83 mg/g; reducing sugars in an amount of 216–264 mg/g, pectin in an amount of 18–22 mg/g, free aminoacids in an amount of 27–33 mg/g, organic acids in an amount of 36–44 mg/g, sterols in an amount of 4.4–5.5 mg/g, methylsterols in an amount of 1.35–1.65 mg/g, dimethylsterols in an amount of 1.98–2.42 mg/g, lignanes in an amount of 13/5–16.5 mg/g, lignane glycosides in an amount of 9–11 mg/g, phenoloacids in an amount of 13.5–16.5 mg/g, phenol aldehydes in an amount of 4.5–5.5 mg/g, alkylferulates in an amount of 4.5–5.5 mg/g.

The beverage according to the present invention contains, kg per 1,000 dal of the beverage:

| | |
|---|---|
| composition inhibiting a pathological addiction to alcohol | 473–493 |
| 40° fruit alcohol such as pear alcohol, apple alcohol, plum alcohol, tangerine alcohol | 4,950–5,050 |
| sugar | 95–105 |
| citric acid | 1.8–2.2 |
| tint | 28–32 |
| an aqueous-alcoholic liquid comprising a mixture of water and ethanol in a desired ratio | the balance. |

The desired ratio of ethanol and water in this mixture depends on the final strength of the produced beverage.

When the alcoholic beverage of the present invention is consumed, the process of the formation of a physical dependence on ethanol in the organism is inhibited. Furthermore, drinking of this beverage is not accompanied by such negative effects as a "hangover" syndrome.

The testing test value of the alcoholic beverage according to the present invention is not less than 9.1 points. An improvement in organoleptic properties is attained due to an increased content of aromatic substances, in particular esters of derivatives of aromatic acids and higher alcohols, as well as due to interaction of aldehydes, ketones, acetals and alkylferulates being present in the beverage composition.

The alcoholic beverage according to the present invention is produced in the following manner. Blended are: a composition inhibiting the development of a pathological addiction to alcohol, a fruit alcohol, sugar, citric acid, a tint, whereafter the resulting blend is added with an aqueous-ethanolic liquid in an amount necessary to obtain the beverage of 40% strength. Then the resulting blend is subjected to a successive heat treatment for three times at a temperature of 70°–80° C. for a period of 5–8 hours. Thereafter, the blend is cooled for a period sufficient to acquire, by the blend, a temperature within the range of from 0° to −10° C. Then the thus-produced beverage is filtered, allowed to stand for 10 days at a temperature varied within the range of from 0° to 45° C. and again filtered.

EXAMPLE 1

Blended are 483 kg of a composition containing, mg/g: leukoanthocyans—245.0, catechins—180.0, flavanols—90.0, lignin—75.0, reducing sugars 261.7, pectin—20.0, free aminoacids—30.6, organic acids—39.0, sterols—5.0, methylsterols—1.5, dimethylsterols—2.2, lignanes—15.0, lignane glycosides—10.0, phenolacids—15.0, phenol aldehydes—5.0, alkylferulates—5.0, 40° pear alcohol—4,990 kg, sugar—105 kg, citric acid—2.2 kg, tint—32 kg and an aqueous-ethanolic liquid in an amount required to obtain a blend of a 40 vol.% strength. The blend is subjected to a triple successive heat treatment at the temperature of 75° C. for 6 hours. Thereafter the blend is cooled to a temperature of 0°–2° C. Then the beverage is filtered, settled for 10 days at a temperature within the range of from 10° to 15° C.

The final product is filtered while being bottled.

EXAMPLE 2

A beverage is produced by blending 473 kg of a composition containing the following ingredients in the amounts specified hereinbelow, mg/g: leukoanthocyans—219, catechins—153, flavanols—81, lignin—68, reducing sugars—345.17, pectin—16, free aminoacids—27, organic acids—36, sterols—4.5, methylsterols—1.35, dimethylsterols—1.98, lignanes—13.5, lignane glycosides—9, phenoloacids—13.5, phenol aldehydes—4.5, alkylferulates—4.5, It also contains, as indicated in Example 1, 4,950 kg of a 40° plum alcohol, 95 kg of sugar, 1.8 kg of citric acid, 28 kg of a tint and an aqueous-ethanolic liquid in an amount sufficient to obtain a blend with the strength of 40 vol. %. Thereafter the blend is subjected to a triple successive heat treatment for 5 hours at the temperature of 80° C. Then the blend is cooled for a period of time sufficient to acquire a temperature of 0° to 1° C. Then the beverage is filtered, allowed to stand for 10 days at a temperature of 20° to 22° C.

The final product is again filtered when being bottled.

EXAMPLE 3

Blended are 493 kg of a composition containing the following ingredients in the amounts specified hereinbelow, mg/g: leudoanthocyans—270, catechins—187, flavanols—99, lignin—83, reducing sugars—197.5, pectin—22, free aminoacids—33, organic acids—44, sterols—5.5, methylsterols—1.65, dimethylsterols—2.42, lignanes—16.5, lignane glycosides—11, phenoloacids—16.5, phenol aldehydes—5.5, alkylferulates—5.5, a 40% tangerine alcohol—5.050 kg, sugar—105 kg, citric acid—2.2 kg, tint—32 kg, an aqueous-alcoholic liquid in an amount sufficient to obtain a blend of a 40 vol. % strength. Thereafter the blend is subjected to a triple successive heat treatment for 5 hours at the temperature of 80° C. Then the blend is cooled for a period of time sufficient for it to acquire a temperature of 8°–0° C. Then the beverage is filtered, allowed to stand for 10 days at a temperature of from 40° to 45° C.

The final product is again filtered when being bottled.

What is claimed is:

1. An alcoholic beverage consisting of the following components, per 1,000 decaliters of the beverage:
   (1) 473–493 kg of a composition inhibiting the development of a pathological addiction to alcohol and containing the following ingredients, mg/g:

| | |
|---|---|
| leukoanthocyanes | 219–270 |
| catechins | 153–187 |
| flavonols | 81–99 |
| lignin | 68–83 |
| reducing sugars | 216–264 |
| pectin | 18–22 |
| organic acids | 76.5–93.5 |
| sterols | 4.5–5.5 |
| methylsterols | 1.35–1.65 |
| dimethylsterols | 1.98–2.42 |
| lignans | 13.5–16.5 |
| lignan glycosides | 9–11 |
| phenolic aldehydes | 4.5–5.5 |
| alkylferulates | 4.5–5.5 |

(2) 4,950–5,050 kg of a 40° fruit alcohol,
   (3) 95–105 kg of sugar,
   (4) 1.8–2.2 kg of citric acid,
   (5) 28–32 kg of a tint, and
   (6) 4,317.8–4,452.2 kg of an aqueous-alcoholic liquid.

2. An alcoholic beverage according to claim 1 containing about 40 percent ethanol and about 5 percent by weight of said components.

3. The beverage of claim 1 wherein said organic acids contain 27–33 mg of free aminoacids.

4. The beverage of claim 1 wherein said organic acids contain 13.5–16.5 mg of phenolic acid.

5. The beverage of claim 1 wherein said organic acids contain 36–44 mg of citric acid.

6. A method for producing an alcoholic beverage, comprising:

blending 473–493 kg of composition (1) of claim 1, 4.950–5.050 kg of a 40° fruit alcohol, 95–105 kg of sugar, 1,8–2.2 kg of citric acid, 28–32 kg of a tint to form a blend;

adding the resulting blend with an aqueous-alcoholic liquid in an amount necessary to obtain 1,000 decaliters of the beverage;

subjecting said blend to a tripe successive heat treatment for 5–8 hours at a temperature within the range of from 70° to 80° C.;

cooling said blend after the heat-treatment thereof for a period of time sufficient to impart to the blend a temperature within the range of from 0° to −10° C.;

allowing the blend to stand till its clarification; and filtration of said clarified blend.

* * * * *